H. ALLEN.
Terrestrial-Globe.
No. 217,671. Patented July 22, 1879.
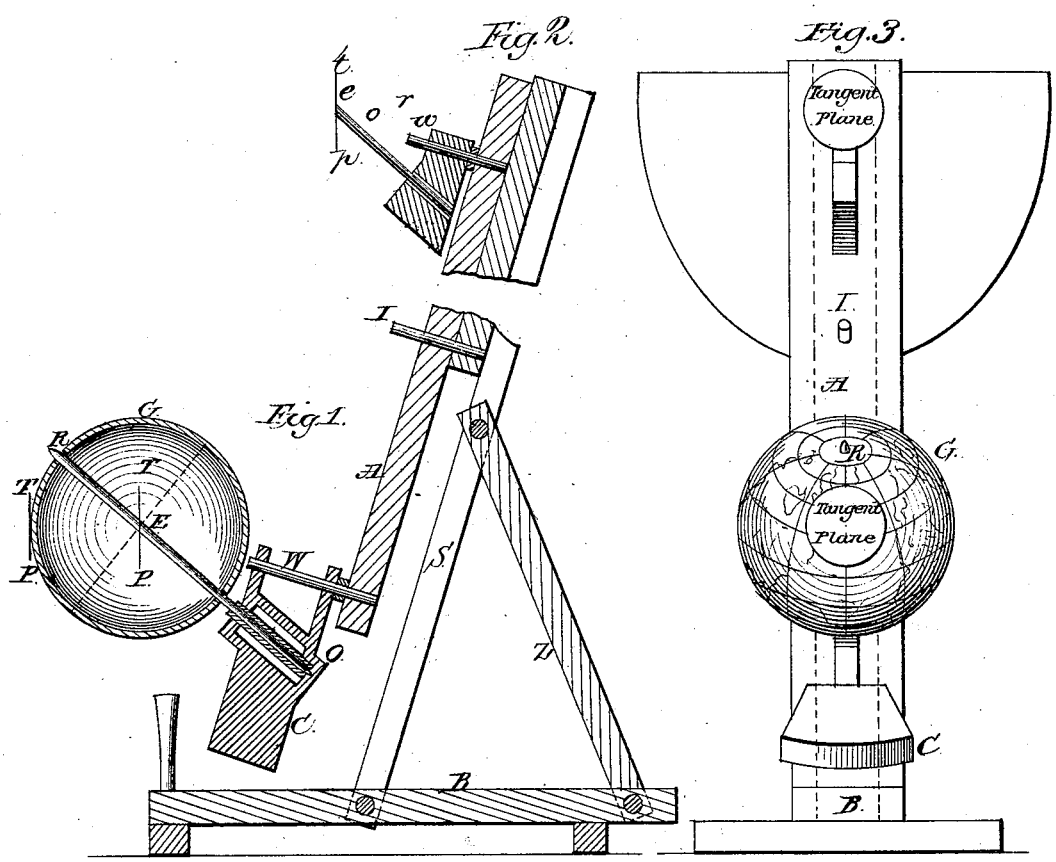

UNITED STATES PATENT OFFICE.

HORATIO ALLEN, OF SOUTH ORANGE, NEW JERSEY.

IMPROVEMENT IN TERRESTRIAL GLOBES.

Specification forming part of Letters Patent No. 217,671, dated July 22, 1879; application filed April 23, 1875.

*To all whom it may concern:*

Be it known that I, HORATIO ALLEN, of the town of South Orange, county of Essex, State of New Jersey, have invented a new and useful Improvement in Instruments for Presenting and Illustrating Astronomical Facts and Relations; and that said improvement is set forth in the following specification, reference being had to the accompanying drawings.

The object of my said invention is to present a globe representing the earth that may have motion in revolution and motion of rotation at the same time, the plane of motion in revolution being adjustable to any angle with a vertical plane not exceeding thirty degrees, and the axis-line of rotation moving parallel to itself.

Referring to the drawings, the earth is represented by a globe, G, five inches in diameter, or it may be of any suitable size. The said globe is carried by and connected with a steel rod, R, that passes through the center of the globe. The rod R is carried by a tube, O, in which it is free to turn.

When the globe has motion of rotation the rod R partakes of that rotation, and therefore the center line of the rod is the center line of rotation of the globe. The axis-line of the globe (represented by the rod R) is, for convenience, called the "axis-line rod."

The tube O is carried by and fixed in the rod of the pendulum C. The pendulum C is suspended on a steel wire, W, and is free to hang in a vertical position.

The suspension-wire is carried at one end of an arm, A, the arm A being free to have motion in revolution on the pin I. The pin I and suspension-wire W are at right angles to the plane of revolution of the arm A, and are therefore parallel to each other.

The center of the globe G is in the line of the center line of the suspension-wire W, and the center line of the tube O extended passes through the center of the globe G, and is in the plane of the center of the globe G, the center line of suspension-wire W, and the center of gravity of the pendulum-weight.

The pin I, the center on which the arm A has motion in revolution, is carried by the standard S, and the said standard is connected at its lower end with the base-piece B by a pin, on which it is free to turn, and is supported in an inclined position by the brace Z, connected at its upper end to the standard by a pin, on which it is free to turn, and at its lower end with the base B by a pin at such point as will hold the plane of the revolution of the center of the globe at any desired angle with a vertical plane. Thus provision is made for the adjustment of the plane of revolution to any angle with a vertical plane, and when the globe moves in revolution, and at the same time has motion of rotation, the axis-line of rotation moves parallel to itself, because the pendulum-rod carrying the axis-line rod is free to hang in a vertical plane in all positions of its motion in revolution.

Vertical planes of such limited extent and so near to each other are parallel planes, and therefore the successive positions of the vertical plane of center of gravity of the pendulum-weight are parallel positions—that is, the vertical plane of center of gravity of pendulum-weight moves parallel to itself; and as by construction the center line of the axis-line rod is in that plane, therefore the center line of the axis-line rod moves parallel to itself; and as the center line of the axis-line rod is the axis-line of rotation of the globe, therefore when the globe moves in revolution, and at the same time has motion of rotation, the axis-line of rotation moves parallel to itself.

The angle made by a plane tangent to the earth at any parallel of latitude to the axis-line of rotation extended is the same as the angle of latitude of that parallel. Through this relation it is practicable, when it is necessary to represent the earth by a point, to present the tangent-plane of any known parallel by a plane passing through the point representing the earth—that is, at an angle with the axis-line same as the angle of latitude of the known parallel.

To present the tangent-plane of parallel 40° north (nearly the parallel of New York) there is attached to the surface of the globe in the parallel of 40° north a thin circular piece marked "tangent-plane," the surface of which is in the plane tangent to the surface of the globe in that parallel. This tangent-plane extended would intersect the axis-line at an angle of forty degrees.

If the globe were of less diameter the angle made by tangent-plane of parallel 40° north with axis-line would always be forty degrees. Therefore, when the earth is represented by a point and the line of its axis-line is presented, the tangent-plane of the parallel 40° is truly presented by a plane through the point representing the earth—that is, at an angle of forty degrees with the axis-line.

In Figure 1 conceive the size of the globe representing the earth to be so small that it can only be presented as a point, and that it is represented by a point, E. The axis-line, being then a line, T P, through the point E at angle of forty degrees with axis-line, would present a line on the tangent-plane of the parallel of 40° north.

The earth being represented by a point, as shown in Fig. 2, the axis-line is carried by the pendulum combination and a tangent-plane at a certain angle with the axis-line. The tangent-plane presents truly the tangent-plane of a parallel whose angle of latitude is that certain angle.

It will be seen that the pendulum combination requires the plane of revolution of the suspension-wire W to be between a vertical position and at an angle of about thirty degrees. The parts providing that incline position are made adjustable, in order that when the instrument is studied in reference to a certain parallel of latitude the plane of revolution of the center of the globe may be adjusted to be parallel to the plane of the orbit of the earth.

When the solar system is represented on a scale of one inch for eleven and a half millions of miles, the sun is represented by a sphere one-thirteenth of an inch in diameter, ($\frac{850000}{11500000} = \frac{1}{13}$,) and the earth would be represented by a globe one fifteen-hundredth of an inch in diameter ($\frac{8000}{11000000}$.) That dimension not being visible to the eye, the globe can only be presented by a point; but the axis-line of the globe can be presented by the axis-line rod, the center line of which is the axis-line; and the tangent-plane of a known parallel can be presented by a plane surface carried by the axis-line rod at the center of the globe, and at an angle with the axis-line same as the angle of the latitude of the known parallel. Fig. 1 presents this combination.

C is the pendulum, suspended on the wire $w$. R is the axis-line rod, carried by the pendulum, the center line of the axis-line rod being in the same plane with the center line of the suspension-wire W, and that plane being at right angles to the plane of revolution.

E is at the point of intersection of the center line of suspension-wire extended with the axis-line. If the globe carried by the axis-line rod were of visible size, the point E would be the center of the globe, and that globe would represent the earth. It is, therefore, the center of a globe one fifteenth-hundredth of an inch diameter, referred to as representing the earth. A globe of that size is not visible to the eye, except as a point; but as its center is at the point E, that point is taken as representing the globe.

The line T E P is a section of a plane passing through the center of the globe at E—that is, at angle of forty degrees with the axis-line.

A plane tangent to the surface of the globe in the parallel of 40° north is at angle of forty degrees with the axis-line.

The two planes may be in a position in which they are parallel, and in that position the two planes would to the eye coincide. Therefore, any angle made by a line to the tangent-plane of parallel of 40° is presented in the instrument by the same angle made with the plane T E P, and, for convenience of reference, the plane T E P is called the tangent-plane of parallel of 40° north.

Instead of using the arm A to carry the suspension-wire, the wire may be carried in a circle or an ellipse by parts movable on a hoop of circular or elliptical form, in which case the wire must be at right angles to the plane of its revolution.

What I claim as my invention is—

1. The combination of the axis-line rod R, carrying the globe G, tangent-plane T E P, passing through the point E, representing the globe, with the rod of a pendulum carried in revolution by a suspension-wire at right angles to the plane of revolution, substantially as described.

2. The combination of the adjustable brace Z with base B and standard S, all combined and arranged to operate as and for the purpose set forth, whereby the angle made by the plane of revolution with a vertical line is determined.

HORATIO ALLEN.

Witnesses:
F. B. SALISBURY,
WM. J. SALISBURY.